(12) United States Patent
Aumo et al.

(10) Patent No.: US 8,501,881 B2
(45) Date of Patent: Aug. 6, 2013

(54) PROCESS FOR OLEFIN POLYMERIZATION

(75) Inventors: Jeannette Aumo, Porvoo (FI); Pasi Matikainen, Espoo (FI); Michael Bartke, Halle (DE); Tom Elovirta, Porvoo (FI); Sameer Vijay, Helsinki (FI); Mikko Lylykangas, Vantaa (FI); Pertti Elo, Järvenpää (FI); Lauri Huhtanen, Loviisa (FI)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/504,975

(22) PCT Filed: Nov. 11, 2010

(86) PCT No.: PCT/EP2010/067268
§ 371 (c)(1),
(2), (4) Date: Jun. 28, 2012

(87) PCT Pub. No.: WO2011/058091
PCT Pub. Date: May 19, 2011

(65) Prior Publication Data
US 2012/0259076 A1      Oct. 11, 2012

(30) Foreign Application Priority Data

Nov. 13, 2009 (EP) .................... 09175891

(51) Int. Cl.
*C08F 2/00* (2006.01)
*C08F 2/02* (2006.01)
*C08F 2/38* (2006.01)
*C08F 10/06* (2006.01)

(52) U.S. Cl.
USPC .............. 526/75; 526/65; 526/206; 526/904

(58) Field of Classification Search
USPC .................... 526/75, 904, 65, 206
See application file for complete search history.

(56) References Cited

U.S. PATENT DOCUMENTS

| 3,242,150 A | 3/1966 | Scoggin |
| 3,324,093 A | 6/1967 | Alleman |
| 3,374,211 A | 3/1968 | Marevil et al. |
| 3,405,109 A | 10/1968 | Rohlfing |

(Continued)

FOREIGN PATENT DOCUMENTS

| EP | 188125 A | 7/1986 |
| EP | 250169 A | 12/1987 |

(Continued)

*Primary Examiner* — Fred M Teskin
(74) *Attorney, Agent, or Firm* — Sutherland Asbill & Brennan LLP

(57) ABSTRACT

The present application provides a process for polymerizing at least one olefin in the presence of a polymerization catalyst, including: (A) continuously introducing a first liquid with a transition metal compound, an organometallic compound, and a solvent and a second liquid into an emulsification stage, (B) continuously withdrawing the emulsion and directing it into a solidification stage to form a slurry with a solid polymerization catalyst component, (C) continuously recovering the solid polymerization catalyst component, (D) directing the solid polymerization catalyst component into a first prepolymerization stage with a monomer and a second liquid to form a slurry, (E) recovering a prepolymerized solid polymerization catalyst component, (F) continuously introducing the prepolymerized solid polymerization catalyst component into a second prepolymerization stage with an olefin monomer to form a prepolymerized catalyst, and (G) continuously withdrawing the prepolymerized catalyst and directing it into a subsequent polymerization stage with at least one olefin monomer.

20 Claims, 2 Drawing Sheets

U.S. PATENT DOCUMENTS

| | | | |
|---|---|---|---|
| 4,543,399 | A | 9/1985 | Jenkins, III et al. |
| 4,578,879 | A | 4/1986 | Yokoyama et al. |
| 4,582,816 | A | 4/1986 | Miro |
| 4,621,952 | A | 11/1986 | Aronson |
| 4,632,311 | A | 12/1986 | Nakane et al. |
| 4,803,251 | A | 2/1989 | Goode et al. |
| 4,855,370 | A | 8/1989 | Chirillo et al. |
| 4,933,149 | A | 6/1990 | Rhee et al. |
| 5,026,795 | A | 6/1991 | Hogan |
| 5,391,654 | A | 2/1995 | Ahvenainen et al. |
| 5,632,596 | A | 5/1997 | Ross |
| 6,000,840 | A | 12/1999 | Paterson |
| 6,534,609 | B2 * | 3/2003 | Mitchell et al. ............ 526/160 |
| 8,017,704 | B2 * | 9/2011 | Leskinen et al. ............ 526/90 |
| 2005/0054518 | A1 | 3/2005 | Denifl et al. |
| 2008/0064835 | A1 | 3/2008 | Denifl et al. |
| 2008/0275200 | A1 | 11/2008 | Denifl et al. |
| 2009/0208681 | A1 | 8/2009 | Ernst et al. |
| 2010/0240836 | A1 | 9/2010 | Denifl et al. |
| 2010/0272939 | A1 | 10/2010 | Fiebig et al. |

FOREIGN PATENT DOCUMENTS

| | | | |
|---|---|---|---|
| EP | 369436 | A | 5/1990 |
| EP | 479186 | A | 4/1992 |
| EP | 503791 | A | 9/1992 |
| EP | 560035 | A | 9/1993 |
| EP | 579426 | A | 1/1994 |
| EP | 600414 | | 6/1994 |
| EP | 629631 | A | 12/1994 |
| EP | 629632 | A | 12/1994 |
| EP | 696293 | A | 2/1996 |
| EP | 699213 | A | 3/1996 |
| EP | 707513 | A | 4/1996 |
| EP | 721798 | A | 7/1996 |
| EP | 776913 | A | 6/1997 |
| EP | 881237 | A | 12/1998 |
| EP | 887380 | A | 12/1998 |
| EP | 891990 | A | 1/1999 |
| EP | 1074557 | A | 2/2001 |
| EP | 1310295 | A | 5/2003 |
| EP | 1 323 747 | A1 | 7/2003 |
| EP | 1415999 | A | 5/2004 |
| EP | 1591460 | A | 11/2005 |
| EP | 1 741 725 | A1 | 1/2007 |
| EP | 11739103 | A | 1/2007 |
| EP | 1752462 | | 2/2007 |
| EP | 1860125 | A | 11/2007 |
| EP | 1939226 | A | 7/2008 |
| EP | 2 042 552 | A1 | 4/2009 |
| EP | 2 065 404 | A1 | 6/2009 |
| WO | 98/40331 | A | 9/1989 |
| WO | 92/12182 | A | 7/1992 |
| WO | 94/25495 | A | 11/1994 |
| WO | 94/25497 | A | 11/1994 |
| WO | 94/28032 | | 12/1994 |
| WO | 95/01831 | | 1/1995 |
| WO | 95/12622 | A | 5/1995 |
| WO | 96/18662 | A | 6/1996 |
| WO | 96/32423 | A | 10/1996 |
| WO | 97/10248 | | 3/1997 |
| WO | 97/28170 | A | 8/1997 |
| WO | 97/33920 | A | 9/1997 |
| WO | 98/32776 | A | 7/1998 |
| WO | 98/58976 | A | 12/1998 |
| WO | 98/58977 | A | 12/1998 |
| WO | 99/10353 | A | 3/1999 |
| WO | 99/12943 | A | 3/1999 |
| WO | 99/41290 | | 8/1999 |
| WO | 99/42497 | A | 8/1999 |
| WO | 00/26266 | A | 5/2000 |
| WO | 00/29452 | A | 5/2000 |
| WO | 01/70395 | | 9/2001 |
| WO | 01/98374 | A2 | 12/2001 |
| WO | 02/02575 | A | 1/2002 |
| WO | 02/02576 | A | 1/2002 |
| WO | 02/48208 | A1 | 6/2002 |
| WO | 02/060963 | | 8/2002 |
| WO | 99/61489 | A | 2/2003 |
| WO | 03/010208 | A | 6/2003 |
| WO | 03/051514 | A | 6/2003 |
| WO | 03/051514 | A1 | 6/2003 |
| WO | 03/051934 | A | 6/2003 |
| WO | 2004/085499 | A | 10/2004 |
| WO | 2005/087361 | A | 9/2005 |
| WO | 2006/069733 | A1 | 7/2006 |
| WO | 2007/025640 | A | 3/2007 |

* cited by examiner

PROCESS FOR OLEFIN POLYMERIZATION

OBJECTIVE OF THE INVENTION

The present invention provides a process for producing an olefin polymer. The process has good production economy and is simple and versatile.

TECHNICAL FIELD

WO-A-02/048208 discloses a process where a titanium-containing liquid is continuously introduced into a reactor containing magnesium halide and the liquid is continuously withdrawn from the reactor. However, only the liquid is continuously withdrawn while the catalyst remains in the reactor and is discharged batch-wise at the end of the synthesis.

WO-A-01/098374 discloses a process where toluene, a metallocene and MAO are continuously introduced into a prepolymerization reactor where the solid catalyst is formed. It does not disclose or suggest making an emulsion.

WO-A-2006/069733 discloses a process for production of olefin polymerization catalyst where the process comprises the stages of emulsification, solidification and catalyst isolation and where at least one of the said stages is conducted continuously. The document does not disclose the prepolymerization step.

WO-A-03/051514 discloses a method of producing a solid catalyst component by preparing an emulsion and solidifying it. The catalyst may be prepolymerized. Possibility to operate the process continuously was not discussed. Further, the catalyst contained a silica support.

While the prior art discloses a continuous method of producing a solid particulate polymerization catalyst there still exists a need for a polymerization process where components forming the catalyst do not dissolve out of the solid particle during polymerization and where the solid particles do not disintegrate during polymerization.

SUMMARY OF THE INVENTION

The Problem Solved by the Present Invention

The present invention provides a simple and economical process for olefin polymerization in the presence of a solid catalyst component comprising a transition metal compound and an organometallic compound of a metal of Group 13 of Periodic System of Elements. Especially the process allows a high productivity of the catalyst, leading to reduced catalyst cost.

Furthermore, the process according to the invention eliminates the problem of the prior art processes, namely the fouling of the polymerization equipment. Practically no polymer agglomerates or soluble polymer is produced and the process can be operated for long periods without disturbances or need for shut-down.

Moreover, polymer powder having good morphology and a low fraction of fine polymer is produced.

BRIEF DESCRIPTION OF THE INVENTION

The present invention provides a process for polymerizing at least one an olefin in the presence of a polymerization catalyst comprising the steps of:
(A) continuously introducing a first liquid comprising a transition metal compound, an organometallic compound of a metal of Group 13 of Periodic System of Elements and a solvent, and a second liquid which together with said first liquid is capable of forming an emulsion, into an emulsification stage to produce an emulsion comprising said first liquid dispersed in said second liquid;
(B) continuously withdrawing an emulsion stream from said emulsification stage and directing it into a solidification stage to form a slurry comprising a solid polymerization catalyst component comprising said transition metal compound and said organometallic compound suspended in said second liquid;
(C) continuously recovering said solid polymerization catalyst component from said solidification stage;
(D) directing said solid polymerization catalyst component into a first prepolymerization stage together with a monomer and an amount of second liquid wherein the monomer is prepolymerized onto said solid polymerization catalyst component so that the ratio of the weight of the polymer to the weight of said solid polymerization catalyst component is from 0.1:1 to 20:1 to form a slurry of a prepolymerized solid polymerization catalyst component suspended in said second liquid;
(E) recovering said prepolymerized solid polymerization catalyst component from said first prepolymerization stage;
(F) continuously introducing said prepolymerized solid polymerization catalyst component into a second prepolymerization stage together with an olefin monomer to form a prepolymerized catalyst comprising in average 100 to 1000 g of polymer per 1 gram of said solid polymerization catalyst component;
(G) continuously withdrawing said prepolymerized catalyst from said second prepolymerization stage and directing it into a subsequent polymerization stage together with at least one olefin monomer to effect polymerization of the at least one olefin monomer in the presence of said prepolymerized catalyst.

DETAILED DESCRIPTION OF THE INVENTION

Definitions

Figure 1:
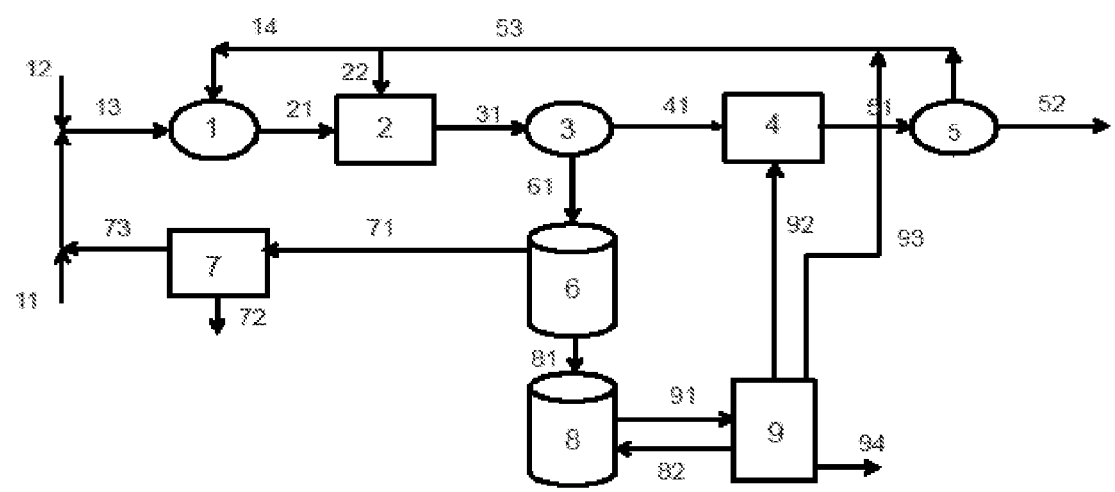
FIG. 1 is a representation of a preferred process design.

In the subsequent text all percent figures are based on weight unless otherwise specifically stated. Thus, a figure of 30% means 30% by weight.

According to the present invention a solid catalyst component is produced in a catalyst preparation unit. The catalyst preparation unit contains equipment where the contacting and solidification stages of the present invention are conducted. Thus, it may contain one vessel, which may contain one or more compartments, or it may contain a set of vessels which may be arranged in parallel or in cascade. The vessels may be tubular or they may be stirred vessels, such as stirred tanks.

The solid catalyst component contains a transition metal compound and an organometallic compound of a metal of Group 13 of Periodic System of Elements. In an especially preferred embodiment the solid catalyst component comprises essentially of the transition metal compound and the organometallic compound. By "comprising essentially" is here meant that while the catalyst may contain a small amount of additional components it does not comprise a separate support material. Thus, preferably the solid catalyst component does not comprise a polymeric or inorganic oxide support, such as silica. Even more preferably the solid catalyst component comprises no more than 10% by weight and still more preferably no more than 5% by weight of components other than the transition metal compound, the organometallic compound and a solvent.

The solid catalyst component is prepolymerized with an olefin monomer so that the amount of the prepolymer per weight of the solid catalyst component is from 0.1 to 20 grams per one gram. The prepolymerized catalyst component is recovered and used in the polymerization process where the polymerization process includes a second prepolymerization step.

The transition metal compound and the organometallic compound are introduced into the catalyst preparation unit in the form of solutions. They are introduced into the catalyst preparation unit continuously. By "continuously" it is meant that either the flows are truly continuous without interruptions or they are intermittent but any interruptions in the flow are negligible in comparison to the average residence time in the process unit. Especially, if the flow is intermittent then the total period of the flow is at most 10% of the average residence time and more preferably at most 5% of the average residence time. However, most preferably the flow is truly continuous. By "total period" is meant, as understood by the person skilled in the art, the duration of one full cycle. Thus, in case of an intermittent flow where a valve is opened, then maintained open for a given time, then closed, then maintained closed for a given time and then opened again, the total period is the time from the first opening to the second opening of the valve.

In a truly continuous process there is an uninterrupted flow of reactants into or product withdrawal from the process step or preferably both. This may be obtained, for instance, by having an open conduit from a process stage. Alternatively, the pipe may have a continuously operating control valve which may, for instance, receive a signal from a flow, level or pressure controller.

Overall Process

One preferred embodiment of the process is shown in FIG. 1. The transition metal component is introduced into an emulsification stage 1 along the line 12. Solvent and organometallic compound, optionally together with additional components, are introduced via line 11. Into the same stream is added recovered transition metal compound via line 73. The solution comprising the solvent and at least some transition metal compound and organometallic compound is hereinafter referred to as a first liquid and is introduced into the emulsification stage 1 via line 13. The liquid forming the continuous phase, which hereinafter is referred to as a second liquid, is introduced into the emulsification stage 1 via line 14. From the emulsification stage 1 the emulsion is directed into a solidification stage 2 along line 21 and additional second liquid, optionally at a higher temperature, enters the solidification stage 2 through line 22. The suspension of the solid catalyst component in a mixed liquid is withdrawn via line 31 and directed into a separation stage 3 where the stream of solid catalyst 41 is separated from the stream of mixed liquid 61.

The stream of solid catalyst is directed into a prepolymerization stage 4. Additional pure second liquid enters the prepolymerization stage 4 through line 92 into which also a stream of monomer (not shown) is combined. The prepolymerized catalyst is withdrawn via line 51 and directed into a separation stage 5. The excess second liquid is removed via line 53 and directed into the emulsification stage 1 through line 14 or into the solidification stage 2 through line 22 or into both stages. The catalyst is recovered via line 52.

The liquid stream from separation stage 3 is directed along line 61 into a liquid separation stage 6 where the first liquid is separated from the second liquid. The first liquid is directed via line 71 into a concentration stage 7 where the solution containing a residual amount of the transition metal compound is concentrated and the excess solvent is removed. The concentrated solution of the transition metal compound is returned into the catalyst preparation via line 73 whereas the solvent is withdrawn via line 72 for eventual further treatment.

The second liquid is withdrawn from the liquid separation stage 6 via line 81 and directed to storage vessel 8. From the vessel 8 the second liquid is directed via line 91 into the purification stage 9. The purified second liquid is directed into emulsification and solidification stages via line 93 and into prepolymerization stage via line 92. The impurity-containing stream 94 is discarded and a recycle stream 82 may be returned into the vessel 8.

Transition Metal Compound

The transition metal compound is preferably a compound comprising a metal of Group 3 to 10 of Periodic table of Elements (IUPAC). More preferably the metal is of Group 3 to 6 and especially preferably of Group 4, such as zirconium or hafnium.

Suitable examples of transition metal compounds are those having a formula

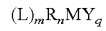

$(L)_m R_n MY_q$

Where each L is independently an organic ligand which coordinates to M; R is a bridging group bridging two ligands L; M is a transition metal of Group 3 to 10 of Periodic Table of Elements; each Y is independently a σ-ligand; m is 1, 2 or 3; n is 0 or, when m is 2 or 3, 0 or 1; q is 1, 2 or 3 and m+q equals to the valency of the metal.

Examples of the ligand L are those including a cyclopentadienyl structure. Thus, ligand L may have a cyclopentadienyl structure, or an indenyl structure, or a tetrahydroindenyl structure, or a fluorenyl structure, or an octahydrofluorenyl structure. These structures may bear substituents at suitable positions, such as alkyl groups, aryl groups, arylalkyl groups, alkylaryl groups, silyl groups, siloxy groups or alkoxy groups and like.

The bridging group R may be, for instance, an alkyl or silyl group, optionally bearing substituents.

Examples of suitable metallocene compounds are given, among others, in EP-A-629631, EP-A-629632, WO-A-00/26266, WO-A-02/002576, WO-A-02/002575, WO-A-99/12943, WO-A-98/40331, EP-A-776913, EP-A-1074557, WO-A-95/12622, WO-A-96/32423, WO-A-97/28170, WO-A-98/32776, WO-A-99/61489, WO-A-03/010208, WO-A-03/051934, WO-A-03/051514, WO-A-2004/085499, EP-A-1752462 and EP-A-1739103, and WO 99/42497.

The transition metal compound may also be a non-metallocene compound, which bears no cyclopentadienyl ligands or fused derivatives thereof, but instead bears one or more non-cyclopentadienyl η- or σ-, mono-, bi- or multidentate ligand. Such ligands can be chosen e.g. from (a) acyclic, $η^1$- to $η^4$- or $η^6$-ligands composed of atoms from 5 Groups 13 to 16 of the Periodic Table (IUPAC), (see e.g. WO 01/70395, WO 97/10248 and WO 99/41290), or (b) cyclic σ-, $η^1$- to $η^4$- or $η^6$-, mono-, bi- or multidentate ligands composed of unsubstituted or substituted mono-, bi- or multicyclic ring systems, e.g. aromatic or non-aromatic or partially saturated ring systems, containing carbon ring atoms and optionally one or more heteroatoms selected from Groups 15 and 16 of the Periodic Table (IUPAC) (see e.g. WO 99/10353). Bi- or multidentate ring systems include also bridged ring systems wherein each ring is linked via a bridging group, e.g. via an atom from Groups 15 or 16 of the Periodic Table, e.g. N, O or S, to the transition metal atom (see e.g. WO 02/060963, WO-A-99/1 0353 or in the Review of V. C. Gibson et al., in Chem. Rev., 2003, 103 (1), pp 283-316, or with oxygen-based ligands, (see the review of Gibson et al.). Further specific examples of non-$\eta^5$ ligands are amides, amidediphosphane, amidinato, aminopyridinate, benzamidinate, azacycloalkenyl, such as triazabicycloalkenyl, allyl, beta-diketimate and aryloxide.

The preparation of metallocene and non-metallocene compounds (preferably metallocene compounds) usable in the invention is well documented in the prior art and reference is made e.g. to the above cited documents. Some of the compounds are also commercially available. The complexes may therefore be prepared according to, or analogously to, the methods described in the literature, e.g. by first preparing the organic ligand moiety and then metallating said organic ligand with a transition metal. Alternatively, a metal ion of an existing metallocene or non-metallocene compound can be exchanged for another metal ion through transmetallation.

Organometallic Compound

The organometallic compound of a metal of Group 13 of Periodic Table of Elements (IUPAC) preferably comprises aluminum or boron as the metal.

More preferably the organometallic compound comprises aluminum or boron as the metal to which alkyl or oxyalkyl groups are attached. Especially suitable compounds are aluminum alkyls and/or aluminoxanes. An especially preferred compound is methylalumoxane (MAO).

Solvent

The solvent used to dissolve the transition metal compound may be the same as or different from the solvent used to dissolve organometallic compound. Preferably the same solvent is used. The solvents may be selected freely as long as they are capable of dissolving the compound in question and do not react with them. Suitable solvents are, for instance, linear, branched or cyclic alkyls having from 1 to 20 carbon atoms, aryls or arylalkyls having from 6 to 10 carbon atoms, halogenated alkyls, such as chlorinated or fluorinated alkyls, having from 1 to 10 carbon atoms, and their mixtures. Examples of such solvents are pentane, hexane, heptane, benzene, dichloromethylene and toluene. An especially preferred solvent is toluene.

First Liquid

The first liquid is the solution comprising the solvent, the transition metal compound and the organometallic compound described above.

Second Liquid

In addition to the solutions of transition metal compound and organometallic compound (first liquid) a component forming the continuous phase of the emulsion (second liquid) needs also to be present. The second liquid needs to be substantially immiscible with the first liquid. By substantially immiscible is here meant that the first liquid and the second liquid do not form a homogeneous solution in the conditions present in the emulsification stage but form a two-phase system comprising a continuous phase and a dispersed phase. When sufficient energy is brought into the mixture, for instance by agitation, the dispersed phase is divided as small droplets within the continuous phase. The size of the droplets then depends on, among others, the amount of energy, the geometry of the vessel and the agitator and the nature of the liquids. Emulsification as such is well known. A useful reference is, among others, Encyclopedic Handbook of Emulsion Technology, edited by Johan Sjöblom, Marcel Dekker Inc., 2001.

Examples of suitable second liquids are halogenated hydrocarbons, such as chlorinated hydrocarbons and fluorinated hydrocarbons, silicon oils and their mixtures. Especially useful compounds are fluorinated hydrocarbons containing from 1 to 20, preferably from 4 to 10 carbon atoms. Especially perfluorinated hydrocarbons having from 6 to 8 carbon atoms, such as perfluorooctane or perfluoro-1,3-dimethylcyclohexane, have been found to produce good results.

Additional Chemical(s)

A stabilizer is preferably used in the process of the invention. The stabilizer may be any compound that stabilizes the emulsion. It may be a surfactant or an emulsifier which may be used to assist in obtaining a stable emulsion. Suitable surfactants are, for example, halogenated hydrocarbons, such as fluorinated hydrocarbons, which additionally may contain a functional group. The surfactants and their use are discussed in WO-A-03/051934 from page 11, line 26 to page 14, line 2.

Thus, an especially useful group of stabilizers is the group of halogenated hydrocarbons, such as fluorinated hydrocarbons, having a functional terminal group. Such compounds may then further be reacted with the organometallic compound of the metal of group 13 or, alternatively, with another compound capable of reacting with it. For example, a highly fluorinated alcohol (such as fluorinated octanol) may be reacted with MAO to produce the stabilizer.

The stabilizer may be added to the first liquid, the second liquid or their mixture, either before making the emulsion or after the emulsion has been formed.

It is also possible to add other chemicals for fulfilling different objectives. However, their nature and amount should be selected so that they do not disturb the emulsion forming process.

Solution Preparation

The solution of the catalyst components forms the first liquid. Any suitable method known in the art may be used to produce the first liquid. The solution is preferably produced in a stirred vessel. The vessel may contain baffles to improve the mixing. The vessel may be lined with an inert coating, such as glass. Residence time depends on the chemicals used. A suitable range of residence time is from 30 minutes to 50 hours, preferably from 1 hour to 24 hours. The temperature also depends on the compounds that are present. It has been found that the temperature can be chosen, for example, from the range of from −20 to +50° C., preferably from −10 to 40° C. The pressure is not important and may range, for instance, from about atmospheric pressure to 100 bar.

The solution may be prepared continuously or batch-wise. Due to relatively long residence time that is often needed it is generally preferred to prepare the solution batch-wise.

The transition metal component and the organometallic component may be brought into the solution simultaneously, or one of the components may be dissolved first in the solvent and the component is then dissolved into this solution, or each component may be dissolved separately and the two solutions may then be combined.

If the solutions are prepared separately the solutions comprising the transition metal compound and the organometallic compound are mixed. The mixing step may be conducted in a stirred vessel as described above or in a tubular vessel. Thus, according to one embodiment both solutions are prepared separately and then directed to a vessel where they are allowed to mix.

According to another preferred embodiment of the invention the transition metal compound and the organometallic compound are brought into a solution simultaneously in one step in a stirred vessel as described above.

According to a further, especially preferred embodiment of the invention the organometallic compound is first dissolved into the solvent and the transition metal compound is then added to that solution in a stirred vessel as described above.

Emulsification

The first liquid as described above is then directed to an emulsification stage together with the second liquid or, where the second liquid is a mixture of components, one or more of the components forming the second liquid. In the emulsification stage an emulsion is formed out of the first liquid and the second liquid so that the first liquid is dispersed within the second liquid. The first liquid is dispersed within the second liquid in the form of droplets. The average size and the size distribution of droplets are important because they determine the corresponding properties of the final catalyst.

The emulsification is conducted within a temperature range that is no higher than the saturation temperature, where a two-phase system of the first liquid and the second liquid is formed. Thus, at the operating temperature the solvent(s) present in the first liquid should not be soluble in the second liquid in a significant degree. Suitable temperature range depends on the choice of the first liquid and the second liquid.

The saturation temperature is defined as the temperature at and below which the system comprising the solvent of first liquid and the second liquid forms a two-phase system at the specific amounts of the first and second liquids. The saturation temperature is thus a function of the composition of the mixture.

Thus, the temperature in the emulsification stage should be no higher than the saturation temperature, preferably at least 2° C. lower than the saturation temperature, more preferably at least 3° C. lower and especially preferably at least 5° C. lower than the saturation temperature. For example, when toluene is used as the solvent and perfluoro-1,3-dimethylcyclohexane as the second liquid then the saturation temperature is typically less than 50° C. for the composition present in the emulsification stage.

If toluene is used as the solvent in the first liquid and perfluoro-1,3-dimethylcyclohexane as the second liquid then a suitable temperature range is from −30 to +50° C., preferably from −10 to +20° C. and most preferably from −5 to +10° C.

The amounts of the first liquid and the second liquid are such that the volume of the first liquid is less than 50% by volume of the combined amount of the first liquid and the second liquid, preferably from 1 to 40%, more preferably from 2 to 30% and in particular from 5 to 25% by volume.

The emulsification may be conducted in any suitable apparatus and technology known in the art that disperses the catalyst solution into the continuous phase.

According to one embodiment the mixture containing the first liquid and the second liquid is transferred into a mixed tank vessel where it is agitated to form the emulsion. The vessel is preferably baffled. Propeller or turbine type impellers may be used for mixing. Good results have been obtained with turbine type impellers. The advantage of mixed vessels is that they are well-known technology. However, they tend to produce a broad droplet size distribution. Moreover, there is often a certain minimum average droplet size depending on the viscosities of and the surface tension between the liquids, below which one cannot go even by increasing the mixing energy brought into the system.

According to another especially preferred embodiment the mixture containing the first liquid and the second liquid is passed through at least one rotor-stator system. Such devices are designed to generate high speed mechanical and hydraulic shearing forces in the material within the device. The forces are created by rotating a rotor relative to the stator such that the material is drawn into the rotor-stator assembly and dispersed radially outward from the rotor-stator assembly. Such devices are disclosed, among others, in U.S. Pat. Nos. 6,000,840 and 5,632,596. The rotor-stator systems considered here are also sometimes called generators and they include the devices which are sometimes referred to as colloid mills.

As the person skilled in the art knows there are different designs for rotors and stators. While different geometries can be used to produce the emulsion it has been found that fine rotor-stator designs typically produce better results than coarse designs. Rotor-stator designs that have been found to produce especially good results are, for instance, 6F of IKA (manufactured by IKA Werke GmbH & Co. KG) and Fine Screen of Ross Inline High Shear Mixer (manufactured by Charles Ross & Son Co.).

The droplet size of the emulsion can be controlled by the tip speed. By selecting a suitable rotor-stator design and then adjusting the tip speed the desired droplet size can be obtained. For instance, by using IKA Process-Pilot 2000/4 with 6F rotor-stator design with a tip speed of from 1.8 to 7.7 m/s, preferably from 1.8 to 4 m/s has been found to produce good results.

The advantage of rotor-stator systems is their flexibility. The droplet size can easily be controlled by controlling the tip speed, as discussed above. The throughput of the material can be varied in relatively broad range because the particle size is not much influenced by the throughput and tip speed can be used to compensate an eventual effect. By using a rotor-stator it is also possible to put in more energy into the system than by using a mixed vessel.

In addition to single-stage rotor-stator systems also multi-stage systems can be used. With such systems typically a finer droplet size can be achieved. Multi-stage systems are well known in the art and they are available from commercial suppliers.

In addition to what was described above there are other types of rotor-stator systems available also. Such are, for instance, Collovelox (manufactured by ART Prozess- und Labortechnik GmbH & Co. KG), Schold Rotor-Stators (manufactured by Schold Machine Corporation), Bematek K-series Industrial In-Line Mixers or Colloid Mill (manufactured by Bematek) and Reflector (manufactured by Lipp Mischtechnik GmbH). An overview of the technology can be found in Chapter 8, Rotor-Stator Mixing Devices, of Handbook of Industrial Mixing, Science and Practice, edited by Edward L. Paul, Victor Atiemo-Obeng and Suzanne M. Kresta, John Wiley & Sons, 2004.

According to one more embodiment of the invention the mixture containing the first liquid and the second liquid is passed through one or more static mixers. The first liquid stream and the second liquid stream are combined and the combined flow is introduced into a static mixer. The flow is maintained at a suitable temperature below the saturation temperature where a two-phase system of the first liquid and the second liquid is present. Similar temperatures and similar ratios of the first liquid to the second liquid may be used as was discussed above for rotor-stators.

Suitable static mixers are produced, among others, by Sultzer and Chemineer (Kenics KM). A suitable size of a mixer can easily be selected when the flow rate is known.

Static mixers have the advantage of being a simple apparatus without moving parts. Their disadvantage is the difficulty in controlling the particle size in case of variations in throughput or other process conditions. It is possible to produce a narrow particle size distribution by using static mixers. They may have a high pressure drop.

In addition to the methods described above other methods may also be used, for instance homogenizers and ultrasonics.

It is also possible to use two or more emulsification stages. Then each stage may be based on the same principle or alternatively stages based on different principles may be combined.

A summary of the preparation of emulsions is given, for instance, in Kirk-Othmer, Encyclopedia of Chemical Technology, Second Edition, 1965, pages 137-144.

Solidification

To obtain a solid catalyst component the emulsion is directed to a solidification stage. In the solidification stage the solubility of the solvent forming a part of the first liquid into the second liquid is increased. Consequently, the catalyst component which is insoluble to the second liquid solidifies. The underlying principle is to increase the solubility of the solvent present in the first liquid into the second liquid. This removes the solvent from the first liquid and as the catalyst composition is insoluble in the second liquid the catalyst solidifies. This may be done by changing the temperature of the emulsion or changing the composition of the mixture or the combination of both.

Solidification stage may be conducted in any suitable arrangement where the solid particles can be produced from the emulsion. Thus, it may be conducted in a pipe or pipe segment, in a reactor or a vessel, in a pipe junction or like. According to one preferred embodiment of the invention at the solidification stage the temperature of the emulsion is increased so that the catalyst solidifies.

According to an especially preferred embodiment the solidification is conducted in a pipe junction. The emulsion enters the junction via one inlet and additional hot second liquid, or a component forming the second liquid if the second liquid is a mixture, via another inlet. After addition of the hot second liquid solid catalyst particles are formed. A suitable volumetric ratio for the additional second liquid to the emulsion is from 1000:1 to 1:1, preferably from 500:1 to 1:1, more preferably from 100:1 to 1:1 and especially preferably from 70:1 to 3:1, such as 20:1 to 5:1.

The flow rate of the mixture of the emulsion and the additional second liquid is preferably such that the flow within the pipe and pipe junction is turbulent. This causes the solidification to occur quickly. As the person skilled in the art knows a turbulent flow is obtained at high values of Reynolds number, typically for Re>4000. As it is well known in the art, Re is defined as Re=d·v·ρ/η where d is the diameter of the pipe, v is the velocity of the fluid flowing in the pipe, ρ is the density and η is the dynamic viscosity of the fluid.

The temperature of the mixture at the solidification stage is specific for the combination of the solvent and the second liquid. The main requirement is that the solubility of the solvent in the second liquid is sufficiently high to remove the solvent from the first liquid so that the catalyst solidifies. For instance, when toluene is used as the solvent and perfluoro-1,3-dimethylcyclohexane as the second liquid then good results have been obtained when the temperature at the solidification stage has been from 5 to 100° C., preferably from 20 to 60° C., for instance 40 to 60° C. higher than the temperature at the emulsification stage.

The temperature in the solidification stage should be higher than the saturation temperature, preferably at least 20° C. higher than the saturation temperature, more preferably at least 30° C. higher and especially preferably at least 50° C. higher than the saturation temperature. For example, when toluene is used as the solvent and perfluoro-1,3-dimethylcyclohexane as the second liquid then the saturation temperature for the composition present in the solidification stage is typically less than 20° C.

It is possible and sometimes preferable to treat the surfaces of the pipe junction, for instance for reducing the adhesion of the particles to the wall, or for preventing the corrosion of the pipe. Thus, the internal pipe wall may be electropolished, glass lined, Teflon coated or similar.

According to another preferred embodiment of the invention the solidification is conducted in a pipe segment. In such pipe segment the temperature is preferably increased in a short distance so that solidification occurs. This can be obtained by, for instance, by electrical tracing of the pipe or by heating the pipe by means of a heating jacket. It is also preferred that the flow rate of the fluid is such that the flow is turbulent so that sufficient mixing occurs. The conditions that were discussed above apply also in this embodiment.

According to a further embodiment of the invention the solidification is conducted in a vessel. It may be stirred and the temperature in the vessel may be controlled, e.g. by means of a cooling jacket. Second liquid may be added into the vessel and the temperature may be increased as described above. The conditions may be adjusted as described above.

When the catalyst has been solidified the suspension is transferred to a separation stage where the catalyst is separated from the liquid.

In addition to the treatments above the formation and the stability of the solid catalyst component may be enhanced, for instance, by cross-linking the transition metal compound or, preferably, the organometallic compound, or both the transition metal compound and the organometallic compound.

Separating Liquid from Solid (First Separation Stage)

The solid catalyst may be separated from the liquid by any means known in the art. The suitable method depends on the nature of the liquid and the solid catalyst. The separation may be conducted continuously or batch-wise. Preferably the separation is conducted continuously.

According to an especially preferred embodiment the catalyst is separated from the liquid by means of gravity. This is a suitable method especially when perfluoro-1,3-dimethylcyclohexane is used as the second liquid. The suspension comprising the solid catalyst particles is transferred to a vessel where the catalyst particles rise to the surface of the liquid phase. The liquid is then removed from the bottom of the vessel and the solid catalyst is collected at the top. The temperature in the first separation stage must be higher than the saturation temperature. Preferably the temperature of the liquid is maintained at a higher level, such as 40 to 95° C., more preferably 50 to 80° C. When the temperature is maintained at a high level two objectives are achieved. First, the solvent is mostly dissolved in the second liquid into which the solid catalyst component is not soluble. If a system of separate phases of the first liquid and the second liquid would again be formed then the risk of the solid catalyst component being dissolved in the first liquid would increase. Second, when the temperature is high the viscosity of the liquid is low and thereby the catalyst particles surface more quickly. The separation is thus more efficient.

In a continuous operation the stream entering the first separation stage typically contains the solid catalyst in an amount of from 0.1 to 5% by weight of the stream, preferably from 0.5 to 2% by weight. The concentrated catalyst stream typically contains catalyst in an amount of from 60 to 95% by the weight of the concentrated catalyst stream, preferably from 70 to 95% by weight. The liquid stream typically contains catalyst in an amount of less than 1% by weight of the liquid stream, preferably less than 0.5% by weight and more preferably less than 0.1%.

A suitable residence time of the liquid in the separation vessel may be, for instance, from 15 minutes to 10 hours, such as from 30 minutes to 5 hours.

According to another preferred embodiment the catalyst and the liquid are separated by using a filter or a screen. The suspension containing the solid catalyst particles may be passed through one or more screens. The size of the screen openings depends on the particle size of the catalyst to be produced. Typically good results have been obtained by using screens having openings of not more than 1 mm, preferably not more than 0.5 mm. A suitable range for the size of the openings is, for instance, from 0.01 to 0.25 mm, such as 0.02 to 0.1 mm. For instance, wedged wire screens, such as Johnson screens, may suitably be used in this embodiment.

Alternatively, the suspension is passed through a filter where the liquid passes the filter and the solid catalyst remains thereon. The size of the openings may be the same as discussed above.

According to a further embodiment the catalyst is separated from the liquid by using a hydrocyclone.

It is also possible to combine two or more separation methods. Thus, it is possible to separate the bulk of the catalyst from the liquid by means of gravity and additionally to use a screen or a filter of a suitable size for separating the smallest particles from the liquid.

The catalyst withdrawn from the First Separation Stage preferably has a median volumetric particle size of from 1 to 100 μm, preferably from 10 to 80 μm and more preferably from 20 to 60 μm.

Prepolymerization (1$^{st}$ Prepolymerization Step)

The solid catalyst component may be further prepolymerized. The prepolymerization helps to maintain the catalyst particles as solid and prevents the catalyst components from migrating out of the particles, for instance in polymerization reactors.

In the prepolymerization stage a small amount of a monomer, preferably an olefin monomer and in particular ethylene or propylene is polymerized on the catalyst. Other suitable monomers are, for instance, vinylcyclohexane, 4-methyl-1-pentene and 3-methyl-1-butene. Typically the weight of prepolymer per weight of solid catalyst component is from 0.1:1 to 20:1, more preferably from 0.5:1 to 10:1 and in particular from 0.5:1 to 5:1.

The prepolymerization is conducted at conditions which are suitable to effect polymerization of the olefin on the solid catalyst component. Example of a suitable temperature range is from −10 to +100° C., preferably from 0 to 80° C. and more preferably from 20 to 60° C. The pressure may range from atmospheric pressure up to 10 bar. The average residence time is then selected so that the desired weight ratio of the prepolymer to the catalyst is reached. As the person skilled in the art knows, the temperature has a strong effect on the polymerization rate the temperature should be selected so that the desired prepolymer to catalyst weight ratio is obtained within a reasonable residence time.

Hydrogen is advantageously introduced into the prepolymerization stage to control the weight average molecular weight of the prepolymer. Preferably said average molecular weight is from about 200000 g/mol to about 1000000 g/mol, more preferably from 300000 to 700000 g/mol. A too low molecular weight causes the prepolymerized catalyst to become sticky and non-flowing whereas a too high molecular weight may reduce the reactivity of the prepolymerized catalyst.

Also the prepolymerization is preferably conducted continuously. To make sure that each catalyst particle is sufficiently prepolymerized the prepolymerization is preferably conducted in a plug flow reactor, such as a tubular reactor, or in cascaded stages, such as two or more cascaded reactors or a comparted reactor containing two or more cascaded compartments. Such comparted reactor is disclosed, among others, in WO-A-97/33920.

Preferably the prepolymerization is conducted with the second liquid as a diluent. Because the catalyst is insoluble in said second liquid the risk of disintegration of catalyst particles during the prepolymerization is reduced.

Additional second liquid is also introduced into the prepolymerization stage. The amount is such that the concentration of the solids in the prepolymerization stage is at a desired level and that the heat of polymerization can conveniently be reduced.

Thus, the solid catalyst component, which had been separated from the liquid mixture in a prior stage, is continuously metered into the prepolymerization stage. At the same time purified second liquid and olefin monomer are continuously introduced into the prepolymerization stage. It is preferred to control the feed rate of the olefin monomer so that the desired prepolymerization degree (the ratio of the weight of prepolymer to the weight of the catalyst) is obtained.

It is also possible to conduct the prepolymerization batchwise. In such case the process conditions may be selected according to what was described above. However, continuous operation gives a more economical process and is therefore preferred.

It is preferred to conduct the prepolymerization in such a manner that substantially all the monomer introduced into the prepolymerization stage is converted into polymer. Thus, the conversion of the monomer is preferably at least 95%, more preferably at least 99% and especially preferably at least 99.5%. As the person skilled in the art knows, the conversion cannot exceed 100%.

The ratio of the volumetric diameter of the prepolymerized catalyst particle to the volumetric diameter of the original particle is typically from 1.5 to 4, such as about 2. The volumetric median diameter of the prepolymerized catalyst is typically from 5 to 200 μm, preferably from 20 to 150 μm and more preferably from 40 to 100 μm.

Recovery of Prepolymerized Catalyst (Second Separation Stage)

The prepolymerized solid catalyst, the second liquid and eventually non-polymerized monomer withdrawn from the prepolymerization stage are continuously transferred into a second separation stage where the catalyst is separated from the liquid and recovered.

The separation of the catalyst from the liquid can be conducted in the same way as was discussed above in the first separation stage. It can be conducted either batch-wise or continuously, preferably continuously because then better process economy can be achieved. After the catalyst has been separated from the liquid it preferably is further dried with any method known in the art, such as by reducing the pressure to a subatmospheric pressure, or by heating the catalyst, or by purging the catalyst with an inert gas such as nitrogen. Then the prepolymerized catalyst can be packed into storage vessels, transported to polymerization plant and used in polymerization. It is preferred to reduce the content of the residual first and second liquids in the catalyst to a minimum to avoid the losses from the catalyst manufacturing process on one hand and to avoid disturbing the recovery process of the polymerization plant, on the other hand.

The liquid phase is formed by the eventually non-reacted monomer and the second liquid. The residual monomer, if present, is removed from the second liquid, for instance by flashing at a reduced pressure or an increased temperature, or by distillation. After the separation the eventual monomer may be recycled into the prepolymerization stage and the second liquid is directed either to the emulsification stage or to the solidification stage.

Purification of Liquid

The liquid stream withdrawn from the first separation stage contains the first liquid and the second liquid.

The first liquid and the second liquid are separated from each other before they can be reused. The separation is preferably done at conditions where the two liquids are substantially immiscible. Because the liquids are immiscible the separation can advantageously be conducted by the use of gravity, provided that there is a sufficient difference between the densities of the two phases. The separation can be done batch-wise or continuously. Preferably the separation is done continuously.

According to one preferred embodiment the first liquid and the second liquid are separated from the mixed liquid by decantation, i.e., by gravity. The liquid mixture is conducted into a decantation vessel. The average residence time in the vessel is such that there is sufficient time for the phases to separate. The heavier component (typically the second liquid) is continuously withdrawn from the bottom of the vessel while the lighter component (typically the first liquid) is withdrawn from the surface.

Before the decantation stage the mixture must be cooled to such a temperature where the two liquids form two separate phases. The temperature in the separation stage should thus be lower than the saturation temperature. For instance, if toluene is the first liquid and perfluoro-1,3-dimethylcyclohexane is the second liquid then a suitable temperature range is from −30 to +20° C., preferably from −20 to +10° C., such as −5° C. or 0° C. The upper limit for the temperature is defined by the phase equilibrium of the two liquids (that is, a two-phase system needs to be formed) while the lower temperature limit is mainly defined by process economy.

According to another preferred embodiment the first liquid and the second liquid are separated by centrifuging. In this embodiment the liquid mixture is conducted into a centrifuge, preferably continuously operating centrifuge. The heavier component is then withdrawn at the periphery of the centrifuge while the lighter component is withdrawn at the centre. Again, the temperature of the mixture needs to be such that a two-phase system is formed.

First Liquid Recovery

The separated first liquid contains the solvent(s) and also some residual catalyst components dissolved therein. The catalyst components, i.e., the transition metal compound and the organometallic compound are typically expensive and their destruction would mean a significant additional cost. In order to achieve sufficient production economy it is necessary to reuse these components to the maximum extent possible.

The separated first liquid is directed into a concentration stage. There excess solvent is removed and a concentrated solution of catalyst components in the solvent is obtained. The concentration stage may be conducted continuously or batch-wise. According to one preferred embodiment a pre-defined volume of the separated first liquid is collected and then it is concentrated in a batch process. The concentrated liquid is then recycled into the catalyst preparation unit whereas the excess solvent may be directed to additional purification steps and used elsewhere or it may be discarded.

According to one embodiment the concentrated solution is obtained by the means of distillation or stripping at a reduced pressure. Especially the pressure should be adjusted such that the distillation or stripping can be conducted at a temperature of from 0 to 100° C., preferably from 10 to 60° C. and more preferably from 20 to 50° C. Too high temperature could lead into a decomposition of one or both of the catalyst components. The pressure then depends on the specific components that are present in the first liquid. When the solvent present in the first liquid is toluene then a suitable pressure would be, for instance, from 0.01 to 0.2 bar (absolute pressure), preferably from 0.03 to 0.15 bar.

The concentrated solution of catalyst components is then obtained as the bottom product while the excess solvent, eventually containing other lower-boiling impurities, is withdrawn from the top as the distillate. It is economically advantageous if the concentration of the catalyst components in the concentrated solution is approximately the same as the concentration of the catalyst components in the pure feed.

The overhead product contains the solvent(s). In addition it may contain low boiling organometallic compounds (such as aluminum alkyls). It is possible to direct the overhead flow to further purification stages to separate the solvent from the organometallic compounds. Alternatively the overhead product may be disposed of, for instance flared.

The bottom product is then returned into the catalyst preparation unit. It may be advantageous to take samples from the product to analyze the contents of the transition metal compound and the organometallic compound. The fresh feeds of the components may then be adjusted to keep their concentrations at desired levels.

Also other concentration methods known in the art may be used. Thus, flashing may be used to evaporate a part of the solvent. Alternatively, membranes may be used for removing a part of the solvent.

Second Liquid Recovery

The separated second liquid is directed to further purification. According to one preferred embodiment of the invention the purification is done by distillation. However, it is also possible to use other techniques, such as passing the liquid through a fixed bed of a suitable purification catalyst, for example silica. The purification may be conducted as batch or continuous operation. According to one embodiment a predefined volume of the separated second liquid is collected and then it is distilled in a batch process. According to another embodiment the distillation is conducted continuously.

Thus, if perfluoro-1,3-dimethylcyclohexane was used as a second liquid and toluene as the solvent in the first liquid, then the distillate would comprise the azeotropic mixture of toluene and perfluoro-1,3-dimethylcyclohexane (about 8% toluene in 92% of PFC), having a boiling range of 85 to 86° C. at atmospheric pressure. The stream containing perfluoro-1,3-dimethylcyclohexane, having a boiling range of 95 to 102° C. at atmospheric pressure, could be taken out through a side withdraw. Finally, the bottom product mainly comprises decomposition products of catalyst components. In this case the distillate stream typically is about 4 to 5% by weight of the feed, the product stream is about from 92 to 95% by weight of the feed and the bottom product forms the rest. The product stream is advantageously reused in the present catalyst manufacturing process. Thus, it may be directed to the prepolymerization stage or to the solidification stage or to the emulsification stage. The distillate stream may be recycled into the feed stream of the second liquid recovery. The bottom stream may be directed to additional purification steps or it may be discarded. Preferably the amount of the second liquid in the bottom stream is no more than 1% by weight of the feed stream.

As the person skilled in the art knows, the boiling ranges and the sizes of the streams depend on the actual components used. Suitable starting values then may be found in the literature and where they are not available they can be found by laboratory experimentation.

The second liquid can be purified also by passing it through a catalyst bed, such as silica bed. This can be done at ambient temperature, such as from 0 to 40° C., for example 20° C. The pressure is not critical and for economic reasons ambient pressure is often preferred. This is especially useful for removal of eventual solid impurities from the liquid.

Figure 2:
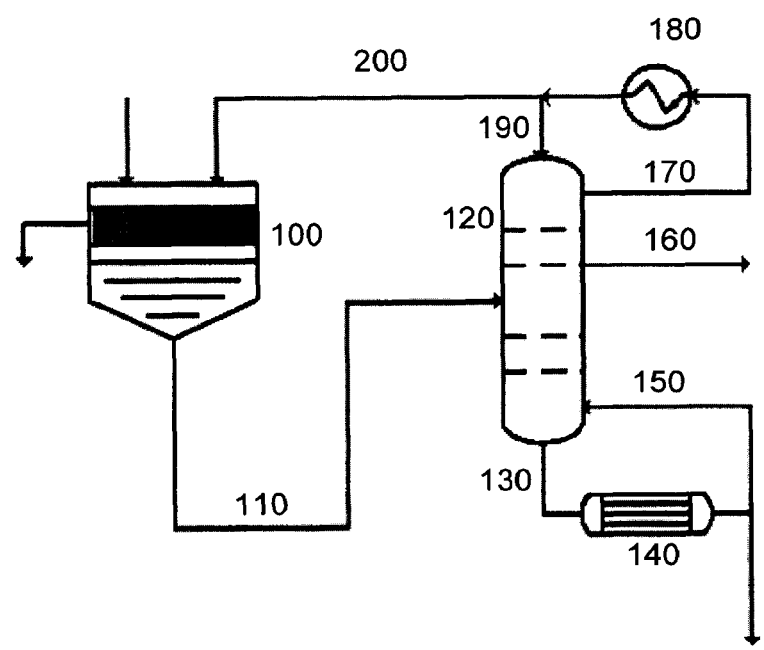
FIG. 2 is a representation of an embodiment for recovering the liquid forming the continuous phase in the emulsion.

An embodiment for continuous operation is shown in FIG. 2. The second liquid is kept in a buffer vessel 100 from where it is directed along pipe 110 into a distillation column 120. A bottom stream is withdrawn from the column 120 along pipe 130 and heated in a reboiler 140. A part of the stream is redirected into the distillation column 120 along pipe 150 while a part is discarded. Purified second liquid stream is withdrawn along pipe 160 and recycled into the catalyst preparation process. A distillate stream is withdrawn along pipe 170 and cooled in a cooler 180. A part of the distillate stream is redirected into the column 120 along pipe 190 while a part is redirected into the buffer vessel 100 along pipe 200.

Polymerization Process

The catalysts prepared according to the present method may be used in any polymerization process known in the art. While it may in some cases be possible to feed the catalyst as such into a slurry reactor or a gas phase reactor, it is normally preferred to prepolymerize the catalyst to maintain a good morphology of the resulting polymer product.

$2^{nd}$ Prepolymerization Stage

Thus, according to one preferred polymerization process the catalyst recovered from the catalyst preparation process as described above is continuously introduced into a second prepolymerization stage where additional olefin, hydrogen and optional comonomer and diluent are introduced. The second prepolymerization stage is maintained in such condition that on average from about 100 to 1000 g, preferably from 150 to 600 g of prepolymer per one gram of catalyst is formed onto the catalyst particles. Suitable conditions for such second prepolymerization stage are well known in the art and can be found, among others, in EP-A-1939226.

The second prepolymerization stage is thus conducted at a temperature which is lower than in the actual polymerization stage and it is preferably conducted at a temperature within the range of from about 0 to 60° C., more preferably from 25 to 60° C. and in particular from 30 to 60° C., such as from 35 to 60° C.

The second prepolymerization stage is suitably conducted as a slurry polymerization by using the same diluent and the same monomer as is used in the following polymerization stages. Especially preferably the second prepolymerization stage is conducted in liquid monomer, such as liquid propylene. However, an inert diluent may also be used, such as propane diluent when using ethylene as monomer. Thereby the slurry from the second prepolymerization stage can be directly transferred to the subsequent polymerization stage without needing to separate any of the components. This also simplifies the recovery of the reaction mixture after the subsequent polymerization stage(s).

The prepolymer slurry is continuously withdrawn from the second prepolymerization stage and directed into a subsequent polymerization stage. The subsequent polymerization stage may be conducted in any means known in the art, such as slurry polymerization or gas phase polymerization.

Subsequent Polymerization

In the subsequent polymerization stage(s) at least one olefin monomer is polymerized in the presence of the prepolymerized catalyst. The at least one olefin to be polymerized may be selected from the group of alpha-olefins having from 2 to 10 carbon atoms, preferably from the group consisting of ethylene, propylene, 1-butene, 1-hexene, 4-methyl-1-pentene, 1-octene, and 1-decene. Together with the at least one olefin monomer also other monomers may be polymerized, such as other alpha-olefins, cyclic olefins such as vinylcyclohexane, vinyl norbornene and styrene, or polyenes, such as dienes or trienes, for instance 1,9-decadiene and 1,7-octadiene. Especially preferably, the at least one olefin mainly comprises ethylene, propylene or their mixture, optionally with a minor amount, up to 10% by mole, of other monomers.

The polymerisation in the subsequent polymerisation stage may be conducted in slurry. Then the polymer particles formed in the polymerisation, together with the catalyst fragmented and dispersed within the particles, are suspended in the fluid hydrocarbon. The slurry is agitated to enable the transfer of reactants from the fluid into the particles.

Slurry polymerisation is preferably a so called bulk polymerisation. By "bulk polymerisation" is meant a process where the polymerisation is conducted in a liquid monomer essentially in the absence of an inert diluent. However, in this respect one should remember that the monomers used in commercial production are never pure but always contain aliphatic hydrocarbons as impurities. For instance, the propylene monomer may contain up to 5% of propane as an impurity. As propylene is consumed in the reaction and also recycled from the reaction effluent back to the polymerisation, the inert components tend to accumulate and thus the reaction medium may comprise up to 40 weight-% of other compounds than monomer. It is to be understood, however, that such a polymerisation process is still within the meaning of "bulk polymerisation", as defined above.

The temperature in the slurry polymerisation is typically from 60 to 110° C. and in particular from 75 to 100° C. The pressure is from 1 to 150 bar, preferably from 10 to 100 bar.

The slurry polymerisation may be conducted in any known reactor used for slurry polymerisation. Such reactors include a continuous stirred tank reactor and a loop reactor. It is especially preferred to conduct the polymerisation in loop reactor. In such reactors the slurry is circulated with a high velocity along a closed pipe by using a circulation pump. Loop reactors are generally known in the art and examples are given, for instance, in U.S. Pat. Nos. 4,582,816, 3,405,109, 3,324,093, EP-A-479186 and U.S. Pat. No. 5,391,654.

The slurry may be withdrawn from the reactor either continuously or intermittently. A preferred way of intermittent withdrawal is the use of settling legs where slurry is allowed to concentrate before withdrawing a batch of the concentrated slurry from the reactor. The use of settling legs is disclosed, among others, in U.S. Pat. Nos. 3,374,211, 3,242,150 and EP-A-1310295. Continuous withdrawal is disclosed, among others, in EP-A-891990, EP-A-1415999, EP-A-1591460 and EP-A-1860125. The continuous withdrawal may be combined with a suitable concentration method, as disclosed in EP-A-1860125 and EP-A-1591460.

The polymerization in the first polymerization stage may also be conducted in a fluidised bed gas phase reactor where an olefin is polymerised in the presence of a polymerisation catalyst in an upwards moving gas stream. The reactor typically contains a fluidised bed comprising the growing polymer particles containing the active catalyst located above a fluidisation grid.

The polymer bed is fluidised with the help of the fluidisation gas comprising the olefin monomer, eventual comonomer(s), eventual chain growth controllers or chain transfer agents, such as hydrogen, and eventual inter gas. The fluidisation gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP-A-684871.

From the inlet chamber the gas flow is passed upwards through a fluidisation grid into the fluidised bed. The purpose of the fluidisation grid is to divide the gas flow evenly through the cross-sectional area of the bed. Sometimes the fluidisation grid may be arranged to establish a gas stream to sweep along the reactor walls, as disclosed in WO-A-2005/087361. Other types of fluidisation grids are disclosed, among others, in U.S. Pat. No. 4,578,879, EP 600414 and EP-A-721798. An overview is given in Geldart and Bayens: The Design of Distributors for Gas-fluidized Beds, Powder Technology, Vol. 42, 1985.

The fluidisation gas passes through the fluidised bed. The superficial velocity of the fluidisation gas must be higher that minimum fluidisation velocity of the particles contained in the fluidised bed, as otherwise no fluidisation would occur. On the other hand, the velocity of the gas should be lower than the onset velocity of pneumatic transport, as otherwise the whole bed would be entrained with the fluidisation gas. The minimum fluidisation velocity and the onset velocity of pneumatic transport can be calculated when the particle characteristics are know by using common engineering practise. An overview is given, among others in Geldart: Gas Fluidization Technology, J. Wiley & Sons, 1986.

When the fluidisation gas is contacted with the bed containing the active catalyst the reactive components of the gas, such as monomers and chain transfer agents, react in the presence of the catalyst to produce the polymer product. At the same time the gas is heated by the reaction heat.

The unreacted fluidisation gas is removed from the top of the reactor and cooled in a heat exchanger to remove the heat of reaction. The gas is cooled to a temperature which is lower than that of the bed to prevent the bed from heating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO-A-2007/025640, U.S. Pat. No. 4,543,399, EP-A-699213 and WO-A-94/25495. It is also possible to add condensing agents into the recycle gas stream, as disclosed in EP-A-696293. The condensing agents are non-polymerisable components, such as n-pentane, isopentane, n-butane or isobutene, which are at least partially condensed in the cooler.

The gas is then compressed and recycled into the inlet chamber of the reactor. Prior to the entry into the reactor fresh reactants are introduced into the fluidisation gas stream to compensate for the losses caused by the reaction and product withdrawal. It is generally known to analyse the composition of the fluidisation gas and introduce the gas components to keep the composition constant. The actual composition is determined by the desired properties of the product and the catalyst used in the polymerisation.

The polymeric product may be withdrawn from the gas phase reactor either continuously or intermittently. Combinations of these methods may also be used. Continuous withdrawal is disclosed, among others, in WO-A-00/29452. Intermittent withdrawal is disclosed, among others, in U.S. Pat. No. 4,621,952, EP-A-188125, EP-A-250169 and EP-A-579426.

The top part of the gas phase reactor may include a so called disengagement zone. In such a zone the diameter of the reactor is increased to reduce the gas velocity and allow the particles that are carried from the bed with the fluidisation gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. Nos. 5,026,795, 4,803,251, 4,532,311, 4,855,370 and EP-A-560035. They are usually polar compounds and include, among others, water, ketones, aldehydes and alcohols.

The reactor may also include a mechanical agitator to further facilitate mixing within the fluidised bed. An example of suitable agitator design is given in EP-A-707513.

The polymerization may also be conducted in a cascaded process comprising at least two polymerisation zones operating at different conditions to produce the polymer. The polymerisation zones may operate in slurry, solution, or gas phase conditions or their combinations. Suitable processes are disclosed, among others, in WO-A-98/58976, EP-A-887380, WO-A-98/58977, WO-A-92/12182, EP-A-369436, EP-A-503791, EP-A-881237 and WO-A-96/18662.

ADVANTAGES OF THE INVENTION

The present process offers an economic way of producing a solid polymerization catalyst component. The polymerization process can be operated at a high productivity of the catalyst and there is a reduced risk of reactor fouling. A wide range of polymers can be produced by the process according to the invention. The resulting particulate polymer has a good morphology and a narrow particle size distribution with reduced amount of fine particles. The process is economically feasible.

EXAMPLES

Methods

Melt Index (MI) or Melt Flow Rate (MFR)

The melt flow rate (MFR) is determined according to ISO 1133 and is indicated in g/10 min. The MFR is an indication of the melt viscosity of the polymer. The MFR is determined at 230° C. for PP. The load under which the melt flow rate is determined is usually indicated as a subscript, for instance $MFR_2$ is measured under 2.16 kg load.

Example 1

1a. Preparation of Solution

Into an agitated vessel having a capacity of 88 litres were introduced 0.79 kg of a transition metal compound rac-dimethylsilanediyl-bis(2-methyl-4-phenylindenyl)zirconium dichloride and 41.5 kg of a solution of 30% MAO in toluene (the solution containing about 27% MAO and about 5% trimethylaluminium). The content of the transition metal compound in the solution was thus about 1.9% by weight. In addition perfluorooctylpropeneoxide was added as a surfactant so that its content in the mixture was 1.4% by weight. They were mixed for a period of one hour at a temperature of −10° C.

1b. Preparation of Emulsion

Into a continuously operating working chamber of an IKA Process-Pilot 2000/4 with 6F rotor-stator design were introduced the solution described above at a rate of 5 kg/h. Additionally perfluoro-1,3-dimethylcyclohexane was fed into the working chamber so that its feed was 90 kg/h. The working chamber, or the emulsification chamber, was maintained at a temperature of +5° C. and the tip speed was 2.1 m/s.

1c. Solidification

The emulsion was continuously removed from the emulsification chamber into a solidification stage. This was a pipe junction where additionally 400 kg/h of perfluoro-1,3-dimethylcyclohexane having a temperature of 70° C. was added. The inner diameter of the pipe was 19 mm and the Reynolds number was thus 11500. The solidification occurred and a suspension of solid catalyst particles in perfluoro-1,3-dimethylcyclohexane was formed.

1d. First Separation Stage

The suspension was directed to a separation vessel operating at 70° C. From the bottom of the vessel a liquid flow of 490 kg/h was continuously withdrawn. From the surface a suspension flow of 3 kg/h was withdrawn containing about 60% by weight of solid catalyst in the perfluoro-1,3-dimethylcyclohexane /toluene solution. The resulting solid catalyst component was collected.

1e. Prepolymerization

About 4 kg of the solid polymerization catalyst component prepared above was suspended in 95 kg of perfluoro-1,3-dimethylcyclohexane from the fluorocarbon recovery in a stirred reactor. The temperature was adjusted 30° C. at the atmospheric pressure. Then propylene was introduced at a rate of 2.5 kg/h and hydrogen at a rate of 5 g/h. The feeds were maintained at these levels until the cumulative propylene feed was about 16 kg and the cumulative hydrogen feed about 32 g. At those times the feeds were stopped. The reaction was allowed to complete after which the contents were discharged. The slurry was filtered and the liquid was directed into buffer vessel from where it was directed into emulsification or solidification stages. The prepolymerized solid catalyst component was dried, stored and subsequently directed to a polymerization process.

1f. Second Separation Stage

As discussed above the second separation stage was conducted by filtering. Slurry comprising about 20 kg of the prepolymerized catalyst was recovered together with liquid so that the slurry contained 90% by weight of prepolymerized catalyst. The slurry was then directed to a drying stage where the prepolymerized catalyst was dried by purging with nitrogen at a temperature of 70° C. Subsequently the prepolymerized catalyst was recovered.

The liquid passing the sieve was recovered and directed to a pressure reduction stage where the pressure was reduced to an atmospheric pressure whereupon eventually unreacted propylene would have evaporated. The propylene stream was directed to a flare whereas the perfluoro-1,3-dimethylcyclohexane stream was divided and directed partly to the emulsification stage and partly to the solidification stage. Before flaring the propylene stream was passed through a cold trap to remove eventual perfluoro-1,3-dimethylcyclohexane from propylene.

1g. Separation of Liquids

The liquid stream from the first separation stage was cooled and directed to a separation vessel which was maintained at a temperature of 10° C. From the top a stream containing toluene and dissolved catalyst components was withdrawn at a rate of about 4 kg/h. From the bottom a stream containing mainly perfluoro-1,3-dimethylcyclohexane was withdrawn at a rate of about 490 kg/h.

Example 2

A stirred tank reactor having a volume of 45 $dm^3$ was operated as liquid-filled at a temperature of 35° C. and a pressure of 54 bar. Into the reactor was fed propylene so much that the average residence time in the reactor was 0.4 hours together with 1.1 g/h hydrogen and 0.25 g/h of a solid polymerization catalyst component produced according to Example 1, recovered in step 1f. In such conditions the amount of polymer produced per amount of catalyst is typically from about 100 to about 300 grams PP/gram catalyst.

The slurry from the prepolymerization reactor discussed above was directed to a loop reactor having a volume of 150 $dm^3$ together with 142 kg/h of propylene. Hydrogen was added at a rate of 1.6 g/h. The loop reactor was operated at a temperature of 70° C. and a pressure of 53 bar. The production rate of propylene homopolymer was 19 kg/h and the melt flow rate $MFR_2$ was 7.2 g/10 min.

The polymer slurry from the loop reactor was directly conducted into a first gas phase reactor operated at a temperature of 75° C. and a pressure of 27 bar. Into the reactor were fed additional propylene and hydrogen, as well as nitrogen as an inert gas, so that the content of propylene was 82% by mole and the ratio of hydrogen to propylene was 0.63 mol/kmol. The production rate in the reactor was 17 kg/h and the polymer withdrawn from the reactor had a melt flow rate $MFR_2$ of 4.2 g/10 min.

The process was operated for a period of several days without any problem of reactor fouling until the end of the campaign. After the campaign the reactors were opened and investigated. No agglomerates or adhesion of polymer on the reactor walls could be detected.

Comparative Example 3

The catalyst was prepared otherwise according to the Example 1 as disclosed above except that the catalyst was recovered after the first separation stage 1d and the prepolymerization stage 1e was not performed.

The catalyst was then used in the polymerization process in the same way as disclosed in Example 2. Thus, the catalyst was first injected into the prepolymerization stage in the 45 $dm^3$ stirred tank reactor and from there the prepolymerized catalyst was continuously directed to the loop reactor and further from there to the gas phase reactor.

The operation was unstable. The transfer pipe between the prepolymerization reactor and the loop reactor plugged several times. After the campaign the reactors were opened and investigated. Agglomerates of polymer were detected in the prepolymerization reactor and the internal wall of the loop reactor was partially covered with a polymeric layer.

Example 4

A 5 litre stainless steel reactor was used for propylene polymerizations. 1100 g of liquid propylene (Borealis polymerization grade) was fed to reactor. 0.2 ml triethylaluminum (100%, purchased from Crompton) was fed as a scavenger and 15 mmol hydrogen (quality 6.0, supplied by Aga) as chain transfer agent. Reactor temperature was set to 30° C. and 52.5 mg catalyst produced according to Example 1, recovered in step 1f, was flushed into to the reactor with nitrogen overpressure. The reactor was heated up to 70° C. in a period of about 15 minutes. After 30 minutes the polymerization was terminated by flashing off the propylene after which the polymer was collected, dried, weighed and analyzed. The amount of polymer was 174 grams.

The temperature increase from 30 to 70° C. was thus equivalent to the prepolymerization. To determine the amount of polymer produced during that period the step of increasing the temperature from 30 to 70° C. during 15 minutes was performed separately. It was then found that during that period 30 grams of polymer was formed, corresponding to a prepolymerization degree of 570 g PP/g catalyst.

The amount of polymer produced during the 30 minute period at 70° C. was thus 144 grams.

Comparative Example 5

The process of Example 4 was repeated except that the catalyst was injected at a temperature of 70° C. into the reactor containing propylene and hydrogen. After 30 minute reaction the reactor was vented and the polymer recovered. In total 110 grams of polymer was formed during the 30 minute period.

By comparing example 2 with comparative example 3 it can clearly be seen that the second prepolymerization step alone is not sufficient as otherwise significant reactor fouling is observed. On the other hand, the comparison of example 4 with comparative example 5 shows that an increased productivity of the catalyst is observed when the catalyst is subjected both to the first and the second prepolymerization step compared to the first prepolymerization step alone.

We claim:

1. Process for polymerizing at least one olefin in the presence of a polymerization catalyst comprising the steps of:
   (A) continuously introducing a first liquid comprising a transition metal compound, an organometallic compound of a metal of Group 13 of Periodic System of Elements and a solvent, and a second liquid which together with said first liquid is capable of forming an emulsion, into an emulsification stage to produce an emulsion comprising said first liquid dispersed in said second liquid;
   (B) continuously withdrawing an emulsion stream from said emulsification stage and directing it into a solidification stage to form a slurry comprising a solid polymerization catalyst component comprising said transition metal compound and said organometallic compound suspended in said second liquid;
   (C) continuously recovering said solid polymerization catalyst component from said solidification stage;
   (D) directing said solid polymerization catalyst component into a first prepolymerization stage together with a monomer and an amount of second liquid wherein the monomer is prepolymerized onto said solid polymerization catalyst component so that the ratio of the weight of the polymer to the weight of said solid polymerization catalyst component is from 0.1:1 to 20:1 to form a slurry of a prepolymerized solid polymerization catalyst component suspended in said second liquid;
   (E) recovering said prepolymerized solid polymerization catalyst component from said first prepolymerization stage;
   (F) continuously introducing said prepolymerized solid polymerization catalyst component into a second prepolymerization stage together with an olefin monomer to form a prepolymerized catalyst comprising in average 100 to 1000 g of polymer per 1 gram of said solid polymerization catalyst component; and
   (G) continuously withdrawing said prepolymerized catalyst from said second prepolymerization stage and directing it into a subsequent polymerization stage together with at least one olefin monomer to effect polymerization of the at least one olefin monomer in the presence of said prepolymerized catalyst.

2. The process according to claim 1 wherein said olefin monomer of said second prepolymerization stage is selected from the group of alpha-olefins having from 2 to 10 carbon atoms.

3. The process according to claim 2 wherein said olefin monomer is selected from the group consisting of ethylene, propylene and a mixture thereof 4. The process according to claim 3 wherein said at least one olefin monomer comprises from 90 to 100% by mole of all the monomers present in the process and other monomers are present in an amount of from 0 to 10% by mole.

5. The process according to claim 1, wherein said first prepolymerization stage is conducted at a temperature within the range of from −10 to +100° C.

6. The process according to claim 1, wherein the monomer of the first prepolymerization stage is selected from the group consisting of alpha-olefins having from 2 to 10 carbon atoms, vinylcyclohexane and mixtures thereof.

7. The process according to claim 1, wherein said organometallic compound of a metal of Group 13 of Periodic System of Elements is an aluminoxane.

8. The process according to claim 1, wherein said solvent is selected from the group consisting of linear, branched or cyclic alkyls having from 1 to 20 carbon atoms, aryls or arylalkyls having from 6 to 10 carbon atoms, halogenated alkyls, having from 1 to 10 carbon atoms, and their mixtures.

9. The process according to claim 1, wherein said second liquid is selected from the group consisting of halogenated hydrocarbons, and silicon oils and their mixtures.

10. The process according to claim 1, wherein the step (E) of recovering the prepolymerized catalyst includes a step of isolating the prepolymerized catalyst from the reaction mixture of the first prepolymerization stage (D).

11. The process according to claim 1, wherein a slurry including the prepolymerized catalyst and the olefin monomer is formed in the second prepolymenzation stage (F) and said slurry is continuously withdrawn from said second prepolymenzation stage (F) and transferred into the subsequent polymerization stage (G).

12. The process according to claim 1, wherein said first prepolymerization stage is conducted at a temperature within the range of from 0 to 80° C.

13. The process according to claim 1, wherein said first prepolymerization stage is conducted at a temperature within the range of from 20 to 60° C.

14. The process according to claim 1, wherein said solvent is selected from the group consisting of pentane, hexane, heptane, benzene, dichloromethylene, toluene and their mixtures.

15. The process according to claim 1, wherein said solvent comprises toluene.

16. The process according to claim 1, wherein said solvent is selected from the group consisting of chlorinated or fluorinated alkyls having from 1 to 10 carbon atoms and their mixtures.

17. The process according to claim 1, wherein said second liquid is selected from the group consisting of fluorinated hydrocarbons containing from 1 to 20 carbon atoms and their mixtures.

18. The process according to claim 1, wherein said second liquid is selected from the group consisting of fluorinated hydrocarbons containing from 4 to 10 carbon atoms and their mixtures.

19. The process according to claim 1, wherein said second liquid is selected from the group consisting of perfluorinated hydrocarbons having from 6 to 8 carbon atoms and their mixtures.

20. The process according to claim 1, wherein said second liquid is selected from the group consisting of perfluorooctane or perfluoro-1,3-dimethylcyclohexane and their mixtures.

* * * * *